United States Patent [19]

Guidosh

[11] 4,035,717

[45] July 12, 1977

[54] ELECTRICAL TRANSFORMER UTILIZING A NO LOAD TAP CHANGER

[75] Inventor: Edward F. Guidosh, Hubbard, Ohio

[73] Assignee: Westinghouse Electric Corporation, Pittsburgh, Pa.

[21] Appl. No.: 732,635

[22] Filed: Oct. 15, 1976

[51] Int. Cl.² .................. H02P 13/06; H01H 21/78; G05F 1/14

[52] U.S. Cl. ......................... 323/43.5 R; 200/11 TC

[58] Field of Search ........... 321/43.5 R; 200/11 TC

[56] References Cited

U.S. PATENT DOCUMENTS

| | | | |
|---|---|---|---|
| 3,155,782 | 11/1964 | Wilson, Jr. | 200/11 TC |
| 3,250,864 | 5/1966 | Bleibtreu et al. | 200/11 TC |
| 3,421,073 | 1/1969 | Perkins | 323/43.5 R |
| 3,612,786 | 10/1971 | Whitman | 323/43.5 R |
| 3,619,764 | 11/1971 | Brennan | 323/43.5 R |

FOREIGN PATENT DOCUMENTS

| | | | |
|---|---|---|---|
| 656,902 | 1/1963 | Canada | 200/11 TC |

*Primary Examiner*—Gerald Goldberg

*Attorney, Agent, or Firm*—D. R. Lackey

[57] ABSTRACT

A three-phase transformer including tap changing apparatus for switching the turns ratio between the primary and secondary windings of the transformer. The tap changer includes a mounting board on which three contact sets are mounted; each set having a plurality of stationary contacts arranged in a circular pattern. A circular-shaped operating member, with a movable contact assembly affixed thereto, is associated with each contact set and is pivotable around the center of the stationary contact set to allow the movable contact assembly to sequentially engage successive stationary contacts. A connecting bar is coupled to each operating member in spaced relation from its axis of rotation, causing all three operating members to rotate together. A worm gear assembly connects an operating handle mounted outside the transformer enclosure to the connecting bar such that rotation of the operating handle causes linear movement of the connecting bar which is translated into arcuate motion of all three operating members to simultaneously switch the tap settings on the transformer.

5 Claims, 5 Drawing Figures

ELECTRICAL TRANSFORMER UTILIZING A NO LOAD TAP CHANGER

BACKGROUND OF THE INVENTION

1. Field of the Invention

This invention relates, in general; to electrical inductive apparatus and, more particularly, to transformers utilizing no-load tap changers.

2. Description of the Prior Art

No-load tap changers are used to change the turns ratio between the primary and secondary windings of a deenergized transformer and thereby change the input or output voltage of the transformer. Conventional no-load tap changers includes a plurality of stationary contact structures and a movable contact assembly which may be moved to engage any of the stationary contacts. The stationary contacts are connected to various sections of either the primary or secondary windings of the transformer thereby causing different lengths and, therefore, a different number of turns of the winding to be energized when a particular stationary contact is engaged by the movable contact.

No-load tap changers for three-phase transformers have a separate set of stationary and movable contacts for each phase winding of the transformer. The movable contacts are usually connected together by a common drive means causing them to rotate together. A conventional arrangement, used in the prior art and disclosed in U.S. Pat. Nos. 3,421,073 and 3,396,248, has the stationary contacts for each phase disposed in a circular pattern around a common axis. The movable contact associated with each set of stationary contacts is adapted for rotation around such common axis so as to make electrical connection with any of the stationary contacts. The movable contact for each phase is connected to a Geneva gear which is driven by a pinion attached to a bevel gear. The bevel gears in each phase are joined together at their centerlines of rotation by a series of shafts which are rotated by another bevel gear assembly connected to the operating handle.

In another method, disclosed in a co-pending application, Ser. No. 599,241, filed July 24, 1975, and assigned to the same assignee as this application, the movable contacts for each phase are attached to individual pinion gears. A connecting rod, which connects all three phases together, has a rack gear at each phase position such that movement of the connecting rod will rotate each pinion gear, thereby switching each movable contact to another stationary contact. The connecting rod is driven by another rack and pinion gear assembly attached to a drive wheel which, when rotated, causes the connecting rod to move in a linear fashion.

Tap changers constructed according to these methods, although satisfactory, require elaborate coupling mechanisms to change the tap settings. In addition, the connecting members must be large and rigid to insure proper alignment of the gear drive trains and also to withstand the large forces required to switch all three phases of the tap changer simultaneously. This not only addes cost to the tap changer, but also increases the size and weight of the transformer since no-load tap changers are usually mounted inside the transformer enclosure. Therefore, it is desirable, and it is the object of this invention to provide a no-load tap changer, mounted inside a transformer enclosure, which is smaller and more economical than no-load tap changers known in the prior art.

SUMMARY OF THE INVENTION

Herein disclosed is a three-phase, electrical transformer utilizing a novel no-load tap changer. The tap changer includes a mounting board on which are located three sets of stationary contacts, each arranged in a circular pattern around a separate axis. Associated with each contact set is a movable contact assembly which is pivotable around the axis of each contact set. The movable contacts are affixed to circular-shaped members or discs which are, in turn, coupled together by a connecting bar attached to each disc in spaced relation from its respective axis of rotation. A worm gear and suitable linkage drives the connecting bar in a linear direction thereby exerting considerable torque on the discs which rotates the discs and switches the movable contacts between successive stationary contacts. The worm gear meshes with a worm which is coupled to an operating handle mounted on the outside of the transformer enclosure such that rotation of the operating handle and the worm causes a proportionate smaller amount of angular rotation of the worm gear and movable contacts.

By effectively utilizing the torque created by the unique arrangement of the discs and connecting bar to switch the tap-settings, the tap changer may be constructed with smaller and lighter components thereby resulting in a compact unit which reduces the overall size and weight of the transformer. Furthermore, the use of a worm and worm gear to translate the motion of the operating handle to motion of the movable contacts further reduces the height of the tap changer thereby saving additional space within the transformer enclosure and also reducing the cable lengths between the windings and the stationary contacts of the tap changer.

BRIEF DESCRIPTION OF THE DRAWING

The various features, advantages and other uses of this invention will become more apparent by referring to the following detailed description and drawing, in which.

DESCRIPTION OF THE PREFERRED EMBODIMENT

Figure 1:
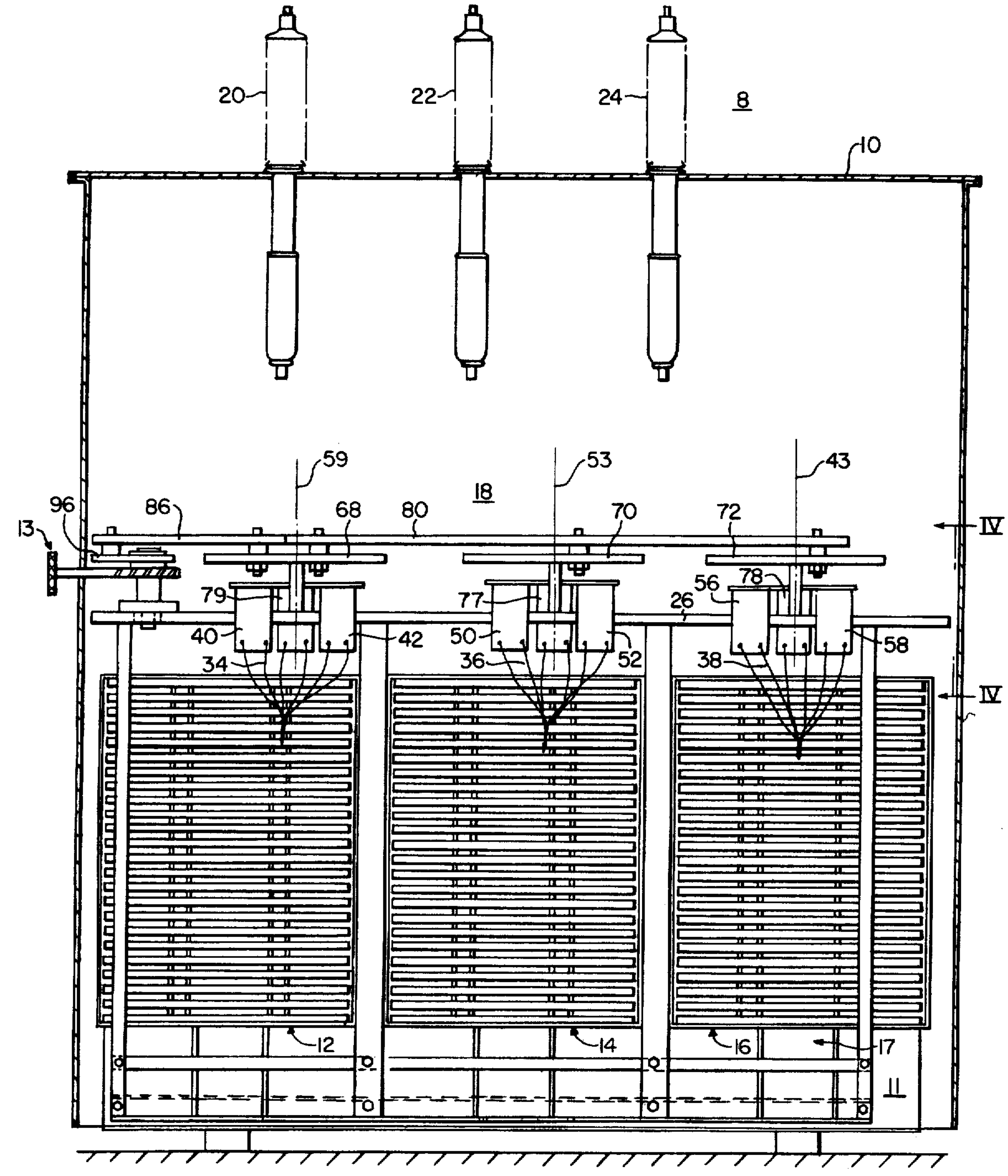
FIG. 1 is an elevational view of a three-phase transformer having a no-load tap changer mounted within the transformer tank.

With reference to the drawing, and to FIG. 1 in particular, there is shown a three-phase transformer 8 comprised of a sealed tank or enclosure 10 surrounding a magnetic core and coil assembly 11, wherein phase windings 12, 14 and 16 are disposed in inductive relation with a three-phase magnetic core 17, and a no-load tap changer 18 constructed according to the teachings of this invention. The tank 10 also supports the bushings 20, 22 and 24 which, although not shown, would normally be connected to electric leads extending into the transformer windings 12, 14 and 16.

The tap changer 18 includes a mounting board 26, constructed of an insulating material, such as a laminated material sold commonly under the trade name "Micarta", which is situated above the magnetic core and coil assembly 11. This mounting board 26 provides the necessary insulation between the grounded switching mechanism of the tap changer and the stationary contacts connected to the windings 12, 14 and 16.

Figure 2:
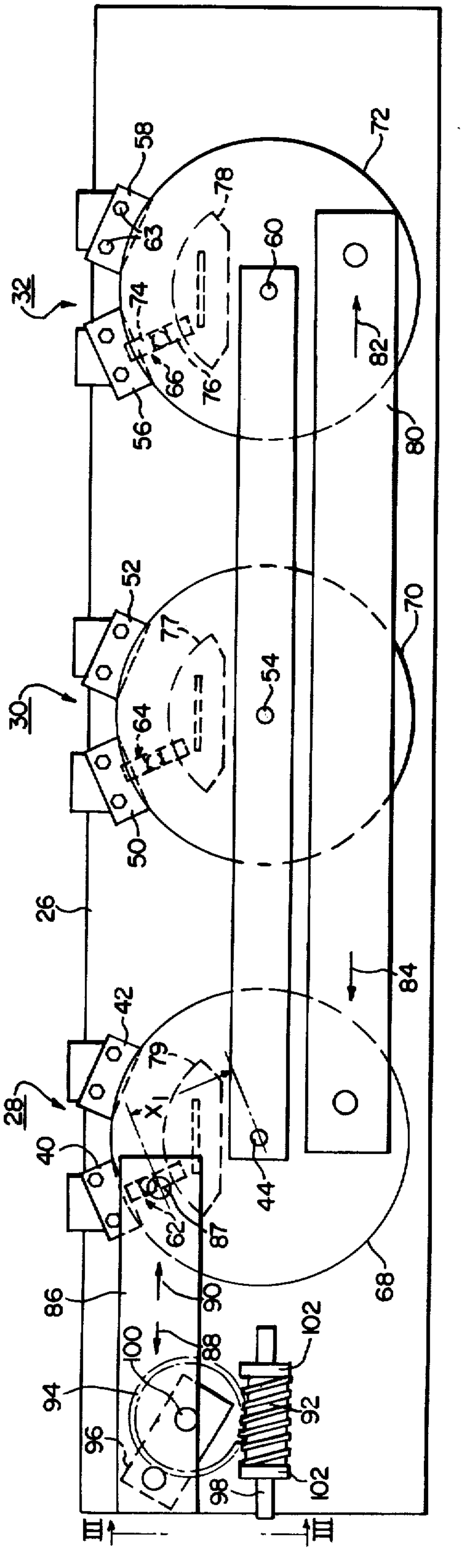
FIG. 2 is a plan view of the tap changer shown in FIG. 1.
Figure 4:
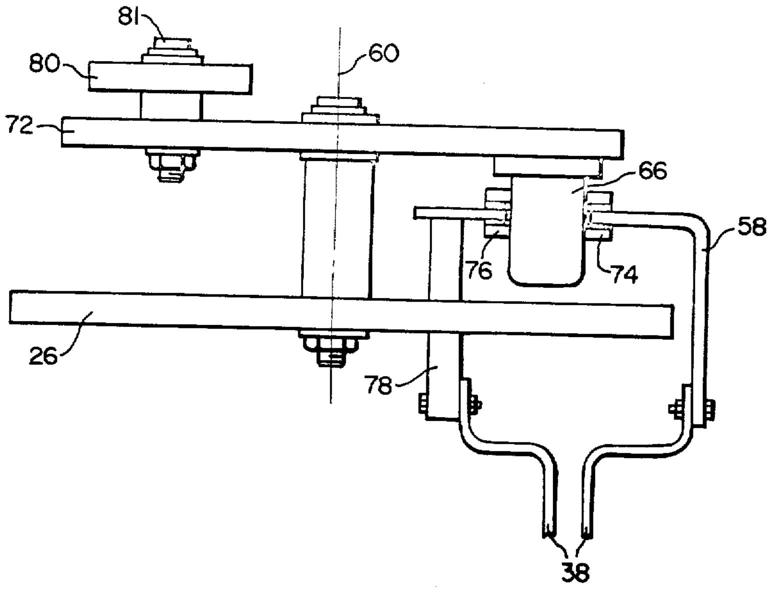
FIG. 4 is an end view of the tap changer taken generally in the direction of the arrow IV in FIG. 1 and showing the contact structure.

Mounted on the board 26 are identical contact sets 28, 30 and 32, as shown in FIG. 2, one of which, such as contact set 32, will be described in detail below; it being understood that the contact sets 28 and 30 are of similar construction. The contact set 32 includes stationary contacts 56 and 58 which are arranged in an arcuate or circular pattern around a pivotal location 60 through which an axis of rotation 59 extends. For illustrative purposes only, two stationary contacts are shown in each phase, although it is understood that additional contacts could be utilized. Each stationary contact is attached to the mounting board 26 by appropriate fastening means, such as the bolts 63 for contact 58. The stationary contacts 56 and 58 are connected to various sections of winding 16 by tap leads 38. The contact set 32 also contains a movable contact 66 suitably fastened to an operating means 72, such as a circular-shaped member or disc, which is rotatable around the pivot location 60 of the contact set 32. As shown in FIG. 4, the movable contact assembly 66 contains a first portion or finger 74 which engages the stationary contacts 56 or 58 and a second portion or finger 76 which is constantly engaged with a fixed terminal 78 attached to the windings of the transformer 8.

In the preferred embodiment, the discs 68, 70 and 72 are in the same plane thereby causing the axes of rotation 43, 53, and 59 to be substantially parallel. A connecting means 80, such as a rod or bar, extends across each disc 68, 70 and 72 and is substantially perpendicular to the resepective axes of rotation 43, 53 and 59. The bar 80 is attached to discs 68, 70 and 72 in spaced relation from the axes of rotation 43, 53, and 59, by suitable means, such as the pin and fastener 81 shown in FIG. 4; thereby causing the discs 68, 70 and 72 to rotate together in a counterclockwise fashion, according to the orientation of the view shown in FIG. 2, when the bar 80 moves in the direction of arrow 82 and in clockwise fashion when the bar 80 moves in the direction of arrow 84. In this manner, movable contact assemblies 62, 64 and 66 are switched between the stationary contacts 40 and 42, 50 and 52, and 56 and 58, respectively, to change the tap settings on the transformer 8.

A drive means 86, such as a rod or bar, is attached to one of the discs 68, 70 or 72 at a predetermined distance "$X_1$" from the axis of rotation of the particular disc. Accordingly, drive bar 86 is attached to disc 68 to point 87 by suitable means, such as the pin and fastener 87 shown in FIG. 2. Thus, when drive bar 86 moves in the direction of either arrow 88 or arrow 90, it exerts a force on disc 68 at point 87. This force, acting at distance "$X_1$" from the axis of rotation 44 of disc 68 creates a torque which is significantly larger than the initiating force. The increase in acting force, due to the torque thus obtained, reduces the amount of input force required to be applied to the drive bar 86 to change tap setting. For example, approximately 800 pounds of force is required to switch tap-settings in a tap changer where such force is applied at the centerline of rotation of each rotating contact, as in prior art tap changers; however, by applying the force at some predetermined distance from the axis of rotation of the rotating contact, similar to "$X_1$", the actual input force need only be 200 pounds. This reduction in input force eliminates the need for large, rigid drive members; thereby resulting in a smaller, more compact tap changer. In prior art tap changers, the input force is applied to the drive means through its centerline of rotation thereby requiring a significantly larger input force than the means used in the presently disclosed tap changer.

Figure 5:
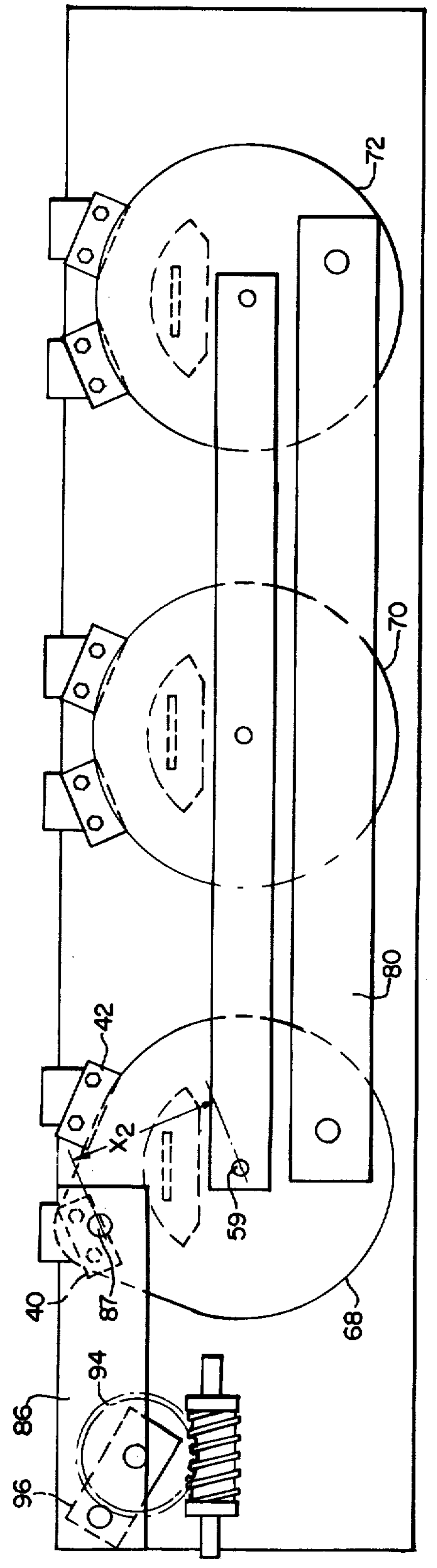
FIG. 5 is a plan view of another embodiment of the tap changer.

FIG. 5 illustrates another embodiment of this portion of the invention, wherein the operating means to which the drive bar 86 is attached, such as disc 68 in the preferred embodiment, is elongated to generally form an oblong surface with at least one lobe portion 85. The drive bar 86 is attached to the operating means 68 near the periphery of the lobe portion 85 at a distance "$X_2$" from the axis of rotation 59 of the operating means 68. A larger moment art is thereby created since the distance "$X_2$" is greater than the distance "$X_1$" in the preferred embodiment. This causes more torque to be applied to the operating means 68 than in the embodiment shown in FIG. 2 and thereby offers a further reduction in the input force required to change tap settings on the transformer, and, accordingly, results in a smaller tap changer.

Figure 3:
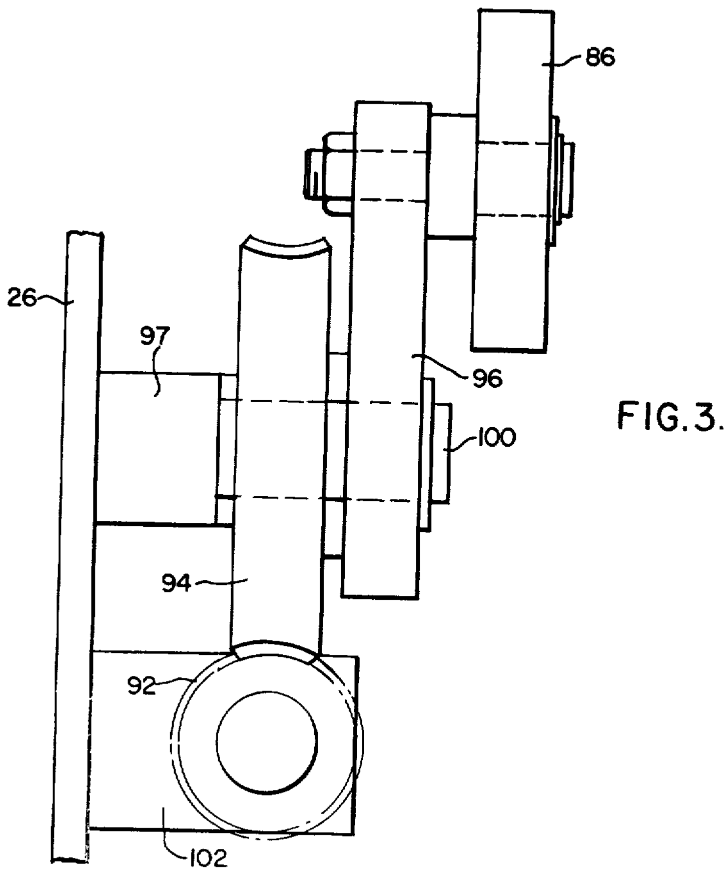
FIG. 3 is an end view of the tap changer taken generally in the direction of the arrow III in FIG. 2 and showing the drive mechanism.

FIGS. 1, 2 and 3 illustrate means for moving the drive bar 86 which consists of a worm 92, a worm gear 94, a link 96 and an operating shaft 98. The operating shaft 98 connects an operating handle 13, mounted outside the transformer enclosure 10, to the worm 92 whose frame 102 is suitably attached to the mounting board 26. The threads on the worm 92 mesh with the teeth on the worm gear 94 such that rotation of the operating shaft from outside the transformer enclosure 10 will rotate the worm gear 94. Although other types of gear mechanisms can be used to drive the switching mechanism of the tap changer 18, including bevel or spur gear sets, a worm and worm gear assembly is utilized in the preferred embodiment since it offers a wider range of reduction ratios than other types of gears and thus can more easily be adapted to different spacings between stationary contacts. Accordingly, in the preferred embodiment, the gear ratio between the worm 92 and the worm gear 94 is 12:1 or in other words, the worm 92 makes 12 complete 360° revolutions to 1 complete revolution of the worm gear 94. Due to the position of the stationary contacts in the preferred embodiment, the worm gear 94 need only rotate 120° to switch the discs 68, 70 and 72 from one stationary contact to another. To achieve this amount of worm gear 94 rotation, the worm 92 must make four complete revolutions based on the 12:1 gear ratio used in the preferred embodiment. The worm gear 94 is keyed or otherwise secured to a shaft or journal 100, held in a frame 97 on the mounting board 26, such that rotation of the worm gear 94 will cause the shaft 100 to rotate. Also keyed or secured to the shaft 100 is a link 96 which couples the shaft 100 to the drive bar 86.

It should be noted at this point that the use of a single gear set, such as worm 92 and worm gear 44, considerably reduces the amount of backlash in the drive mechanism. Every gear set has a certain amount of inherent backlash. However, the amount of backlash becomes a problem when several gear sets are cascaded and connected by shafts, such as those used in the prior art, since the backlash builds up and adds to the backlash or tolerance of the previous gear thereby making alignment of subsequent gears extremely difficult. Furthermore, the stationary contact structures must be made larger to compensate for this tolerance, thereby adding to the size of the tap changer. In a tap changer constructed according to the teachings of this invention, the use of a single gear set eliminates any build-up of backlash, thus providing a smaller, more reliable unit. Also, the 12:1 reduction in the worm 92 and worm gear 94 reduces the amount of backlash resulting from the single gear set to one-twelfth its original amount.

Although the preferred embodiment utilizes a separate drive bar 86 and connecting bar 80, it is within the teachings of this invention to combine these components into one member which is attached to the operating discs 68, 70 and 72 and the link 96 in the manner described above.

To change the tap settings on a three-phase transformer using a no-load tap changer constructed according to the teachings of this invention, the operating handle 13, outside the enclosure, would be moved, for example, from position 1 to position 2. According to the preferred embodiment, the operating handle would be turned four complete revolutions to change the tap settings once. This will impart a counterclockwise rotation to the operating shaft 98, looking in the direction of the axis of rotation of the shaft 98. The worm 92 will also be rotated counterclockwise four complete revolutions thereby rotating the worm gear 94, the link 96 and the drive shaft 100 120° in a clockwise direction. This will cause the drive bar 86 to move in the direction of arrow 88, forcing the disc 68 to rotate in a clockwise manner. The disc 68 will rotate only 45° due to the different lengths of the drive arm 96 and distance "$X_1$". These lengths can be varied to obtain different degrees of disc rotation for different contact arrangements. Clockwise rotation of disc 68 will move the connecting bar 80 in the direction of arrow 84 thereby simultaneously rotating disc 70 and 72 along with disc 68 in a clockwise direction and switching the rotating contacts 62, 64 and 66 from the stationary contacts 40, 50 and 56 to the stationary contacts 42, 52 and 58, respectively. Likewise, rotation of the operating handle from position 2 to position 1 will move the drive arm 86 in the direction of arrow 90 and the connecting bar 80 in the direction of arrow 82, thereby reversing the tap settings on the transformer.

It will be apparent to one skilled in the art, that there has been disclosed a transformer utilizing a small, economical no-load tap changer. By effectively utilizing the torque created by the interconnection of the operating and connecting members, a significant reduction in the input force required to switch the tap settings is achieved; thereby enabling the tap changer to be constructed with smaller and lighter components than no-load tap changers known in the prior art, which reduces the overall size and weight of the transformer.

What is claimed is:

1. An electrical transformer comprising:

a sealed enclosure;

primary and secondary windings in inductive relation with a three-phase magnetic core disposed within said enclosure;

one of said windings in each phase of said transformer having a plurality of taps at which different voltages are provided;

first, second and third contact sets, each including a plurality of stationary contacts positioned in an arcuate pattern around an axis of rotation; said stationary contacts connected to respective taps in each phase of said transformer;

first, second and third movable contacts adapted for making electrical connection with respective stationary contacts of said first, second and third contact sets;

first, second and third operating means with said first, second and third movable contacts, affixed thereto, respectively; said first, second and third operating means being pivotable around said axis of rotation of each contact set to rotate said first, second and third movable contacts, respectively, through sequential engagement with successive stationary contacts of said first, second and third contact sets;

connecting means affixed to said fist, second and third operating means in spaced relation from said axes of rotation of said first, second and third operating means such that linear movement of said connecting means will cause arcuate motion of said first, second and third operating means; and means for moving said connecting means.

2. The transformer of claim 1 wherein the means for moving the connecting means includes a worm coupled to a shaft operable from outside the transformer enclosure, and a worm gear which meshes with the threads of said worm to rotate a link coupled to said connecting means.

3. the transformer of claim 2 wherein the link is coupled to a drive means attached to one of the operating means in spaced relation from the axis of rotation of said operating means, such that movement of said drive means in one direction will rotate said one of said operating means and cause movement of the connecting means in the opposite direction.

4. The transformer of claim 3 wherein the operating means to which the drive means is attached, generally forms an oblong surface, containing at least one lobe portion, with said drive means attached near the periphery of said lobe portion of said operating means.

5. An electrical transformer, comprising:

a sealed enclosure;

primary and secondary windings in inductive relation with a three-phase magnetic core disposed within said enclosure;

one of said windings in each phase of the transformer having a plurality of taps at which different voltages are provided;

first, second and third contact sets, each including a plurality of stationary contacts; said stationary contacts being positioned in an arcuate pattern and attached to an insulating member, with all of said stationary contacts being aligned substantially in the same plane; said stationary contacts connected to respective taps in each phase of said transformer;

first, second and third movable contacts adapted for making electrical connection with respective stationary contacts of said first, second and third contact sets;

first, second and third operating members with said first, second and third movable contacts affixed thereto, respectively; said operating members being pivotable around the axis of rotation of each contact set, respectively, to rotate said first, second and third movable contacts through sequential engagement with successive stationary contacts of said first, second and third contact sets;

said first operating member generally forming an oblong surface with one lobe portion;

a connecting member attached to said first, second and third operating members in spaced relation from the axis of rotation of each operating member thereby causing rotation of said operating members upon linear movement of said connecting member;

a drive member affixed to said first operating member, near the periphery of said lobe portion of said first operating member, such that linear movement of said drive member will cause arcuate motion of said first operating member;

means for moving said drive member including a worm, worm gear and a link; said worm gear and link secured to a common shaft such that both members rotate together upon movement of said worm; and said worm coupled to a shaft operative from outside of the transformer enclosure; said link suitably connected to said drive member such that rotation of said link will cause linear movement of said drive member.

* * * * *